United States Patent [19]

Geppert

[11] 4,316,132
[45] Feb. 16, 1982

[54] PWM INVERTER CONTROL AND THE APPLICATION THEREOF WITHIN ELECTRIC VEHICLES

[75] Inventor: Steven Geppert, Bloomfield Hills, Mich.

[73] Assignee: Eaton Corporation, Cleveland, Ohio

[21] Appl. No.: 36,118

[22] Filed: May 4, 1979

[51] Int. Cl.³ .......................... H02P 5/34; H02P 5/36
[52] U.S. Cl. .................................. 318/723; 318/721; 318/802; 318/811
[58] Field of Search .............................. 318/721–723, 318/798–803, 805, 807, 810–812

[56] References Cited

U.S. PATENT DOCUMENTS

| | | | |
|---|---|---|---|
| 3,297,926 | 1/1967 | Campbell et al. | 318/721 X |
| 3,971,972 | 7/1976 | Stich | 318/811 |
| 3,986,087 | 10/1976 | Zankl et al. | 318/803 |
| 4,078,192 | 3/1978 | Fultz | 318/810 X |
| 4,099,107 | 7/1978 | Eder | 318/802 |
| 4,099,109 | 7/1978 | Abbondanti | 318/811 |

Primary Examiner—Gene Z. Rubinson
Assistant Examiner—Richard M. Moose
Attorney, Agent, or Firm—R. J. McCloskey; J. G. Lewis

[57] ABSTRACT

An inverter (34) which provides power to an A.C. machine (28) is controlled by a circuit (36) employing PWM control strategy whereby A.C. power is supplied to the machine at a preselectable frequency and preselectable voltage. This is accomplished by the technique of waveform notching in which the shapes of the notches are varied to determine the average energy content of the overall waveform. Through this arrangement, the operational efficiency of the A.C. machine is optimized. The control circuit includes a micro-computer and memory element which receive various parametric inputs and calculate optimized machine control data signals therefrom. The control data is asynchronously loaded into the inverter through an intermediate buffer (38). In its preferred embodiment, the present invention is incorporated within an electric vehicle (10) employing a 144 VDC battery pack (32) and a three-phase induction motor (18).

23 Claims, 10 Drawing Figures

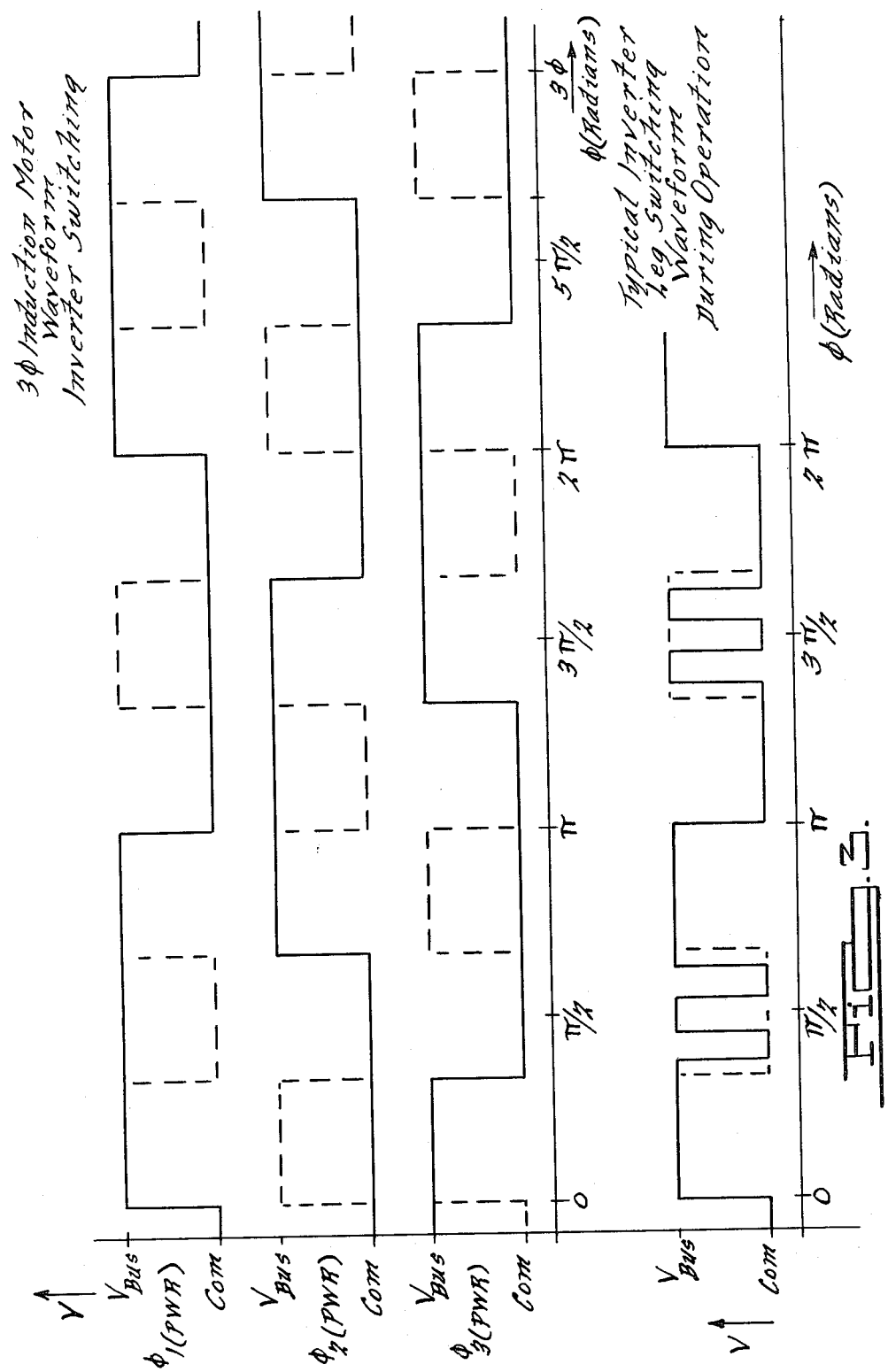

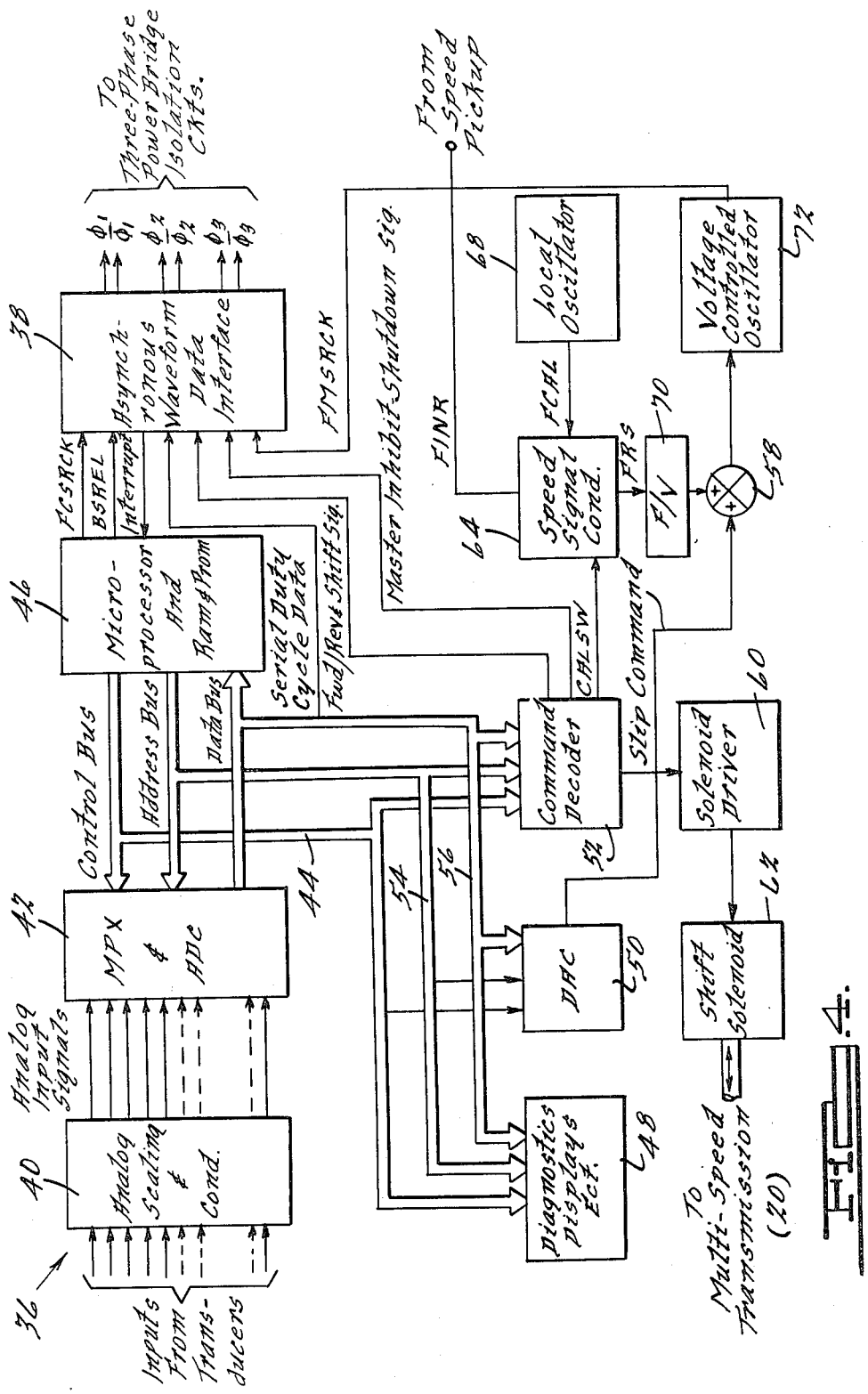

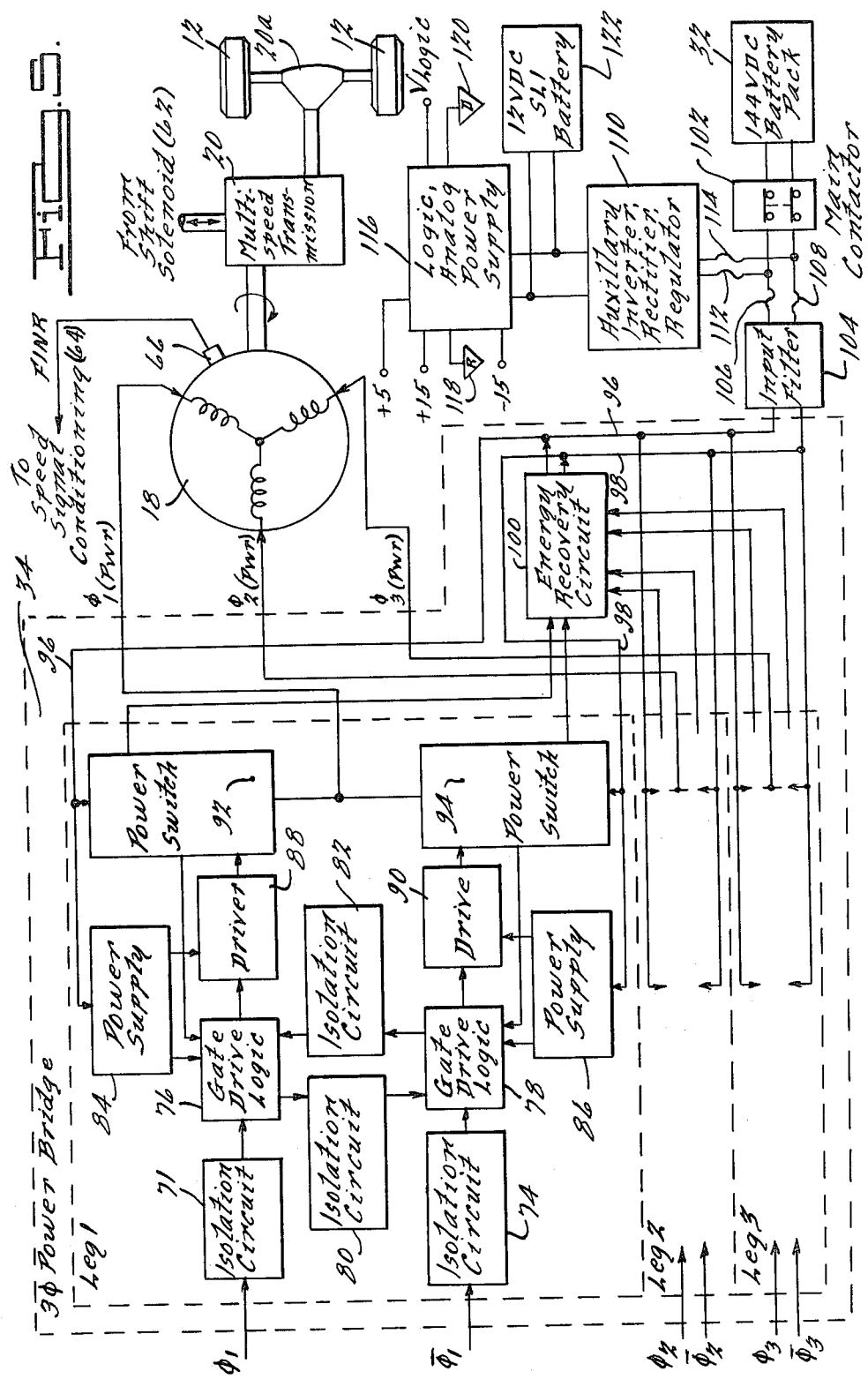

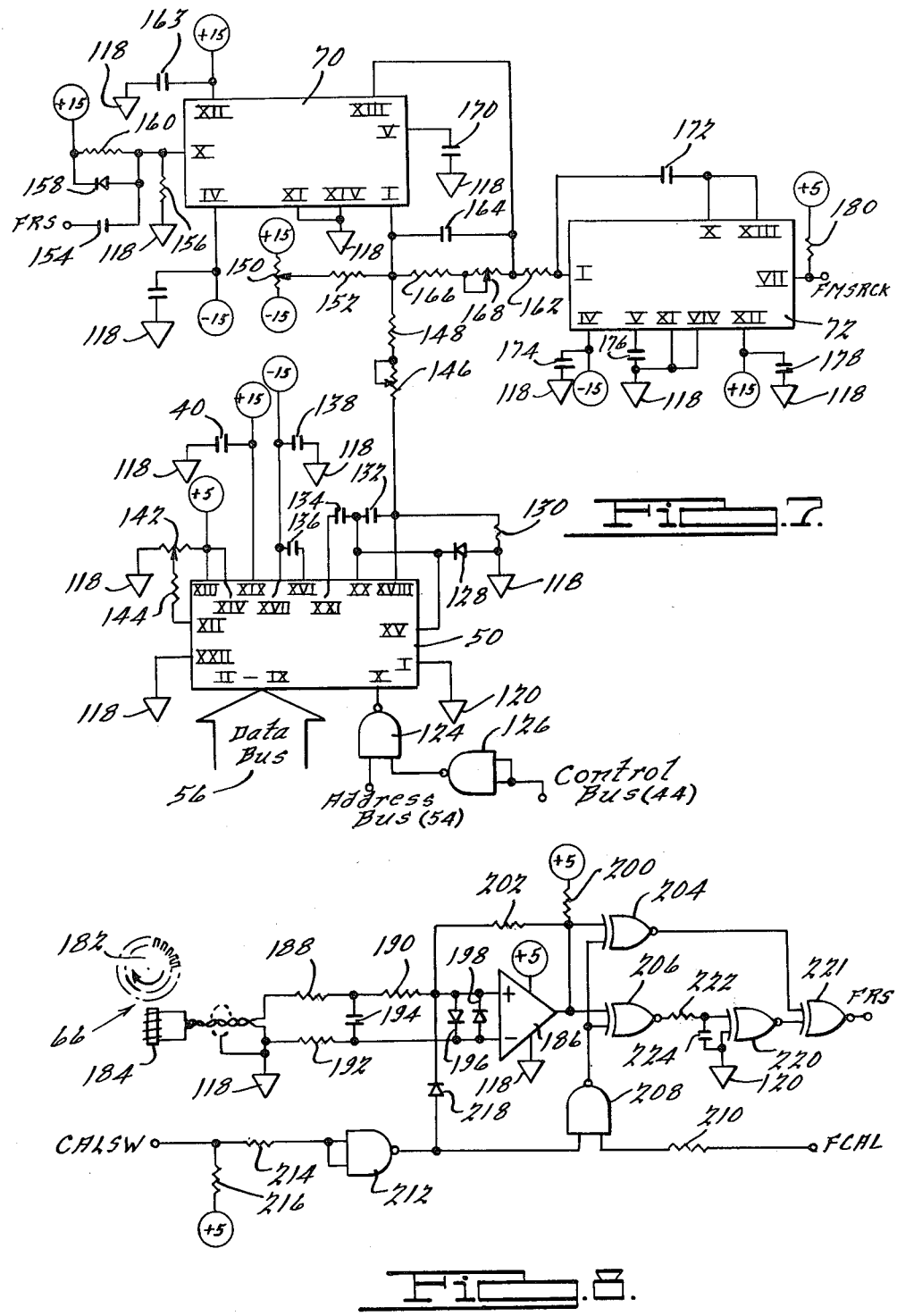

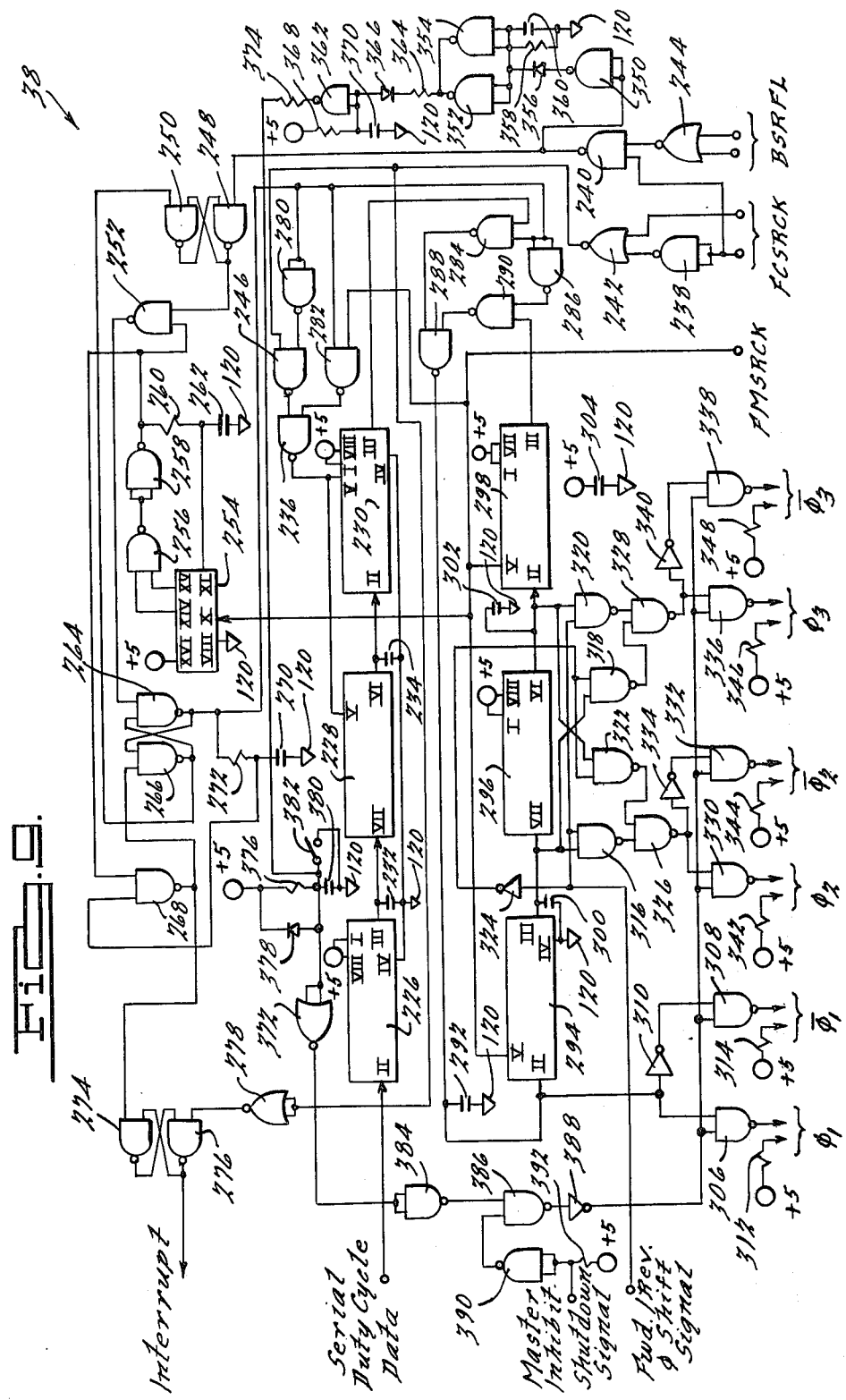

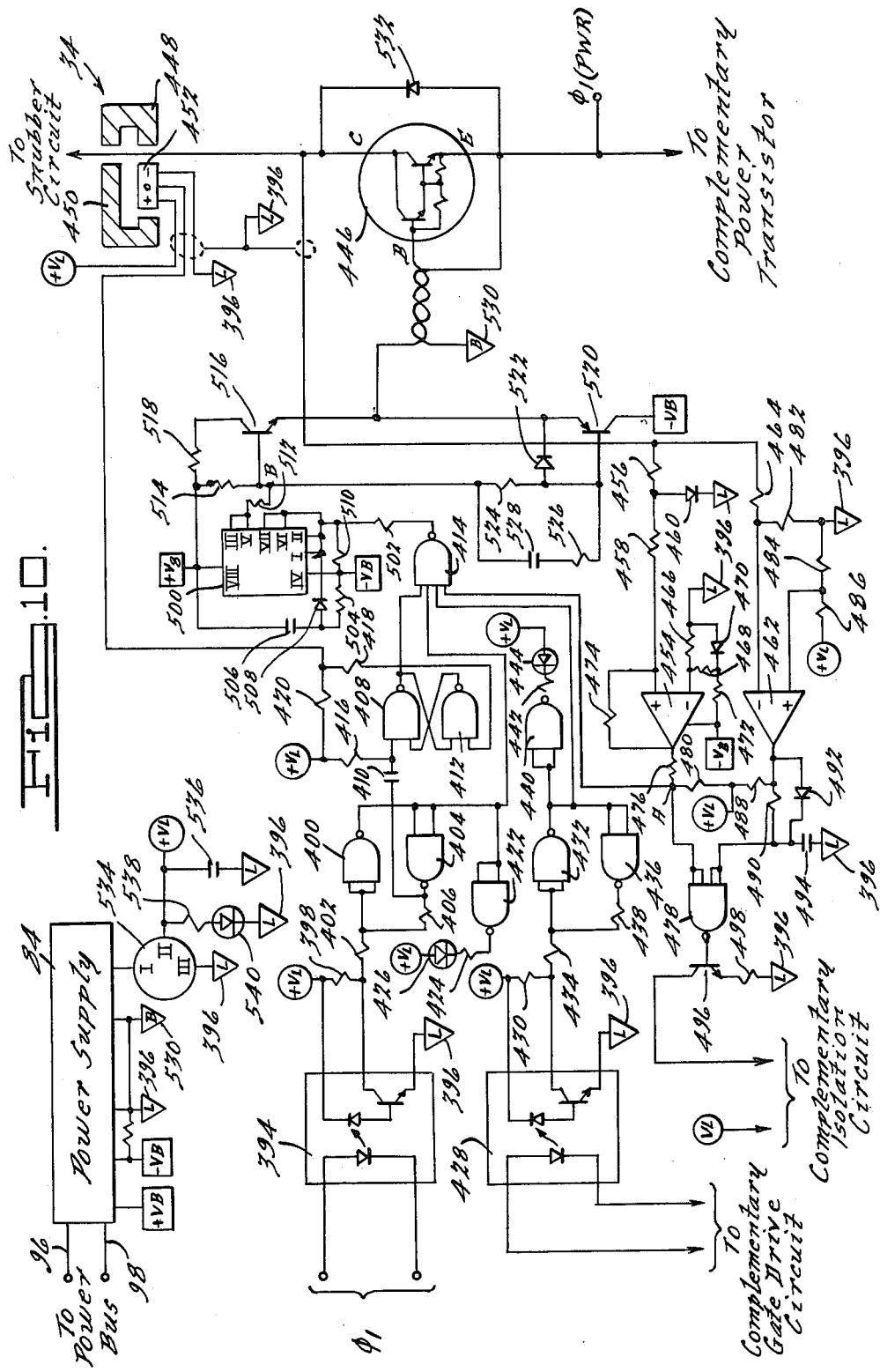

PWM INVERTER CONTROL AND THE APPLICATION THEREOF WITHIN ELECTRIC VEHICLES

INTRODUCTION

The present invention relates to methods and apparatus for controlling A.C. machine inverters and specifically to such methods and apparatus which employ pulse width modulation control strategies. Furthermore, this invention relates to the application of such apparatus within electric powered vehicles.

BACKGROUND OF THE INVENTION

The electric powered passenger vehicle has long been considered one of the most attractive alternatives to conventional internal combustion engine driven types from the standpoints of overall efficiency, environmental impact and, most recently, alternative fuel capability. Many commercial enterprises and private individuals, some under the auspices of the federal government, have proposed various approaches to implementing an electrically powered vehicle. To date, there have been virtually no commercially successful vehicles produced on a large scale.

A large number of approaches to the implementation and control of an electric vehicle are evidenced in the patent literature. Most of the approaches fall within one of three general categories of motive power source. These categories are hybrids, D.C. motor drives and induction motor drives.

The first type, that most frequently found in the patent literature, is the hybrid vehicle, comprising a small gasoline fueled internal combustion engine which mechanically drives an electrical generator which, in turn, supplies electrical energy to an A.C. or D.C. motor. With this arrangement, the gasoline engine can operate at a constant speed (at relatively high efficiency) and achieve a substantial fuel saving compared with an engine employing the conventional wide range of operation. A shortcoming of many hybrids is that they are relatively heavy, requiring an electrical generator and motor as well as the gasoline engine. Additionally, the engine requires substantial amounts of a volatile liquid fuel and generates exhaust emissions.

A second approach taken in the development of electric vehicles is the use of a bank of batteries which supply electrical energy to a D.C. motor. A variable-speed motor drive circuit provides easy and versatile control of the vehicle. The principal advantage of this arrangement is that a D.C. motor control system requires a relatively simple power and control circuit. Unfortunately, this advantage is often more than offset by the relatively large initial cost and maintenance expenses of the motor itself. In addition, D.C. machinery is relatively heavy and bulky, factors which do not lend themselves well to implementation within a lightweight compact vehicle. Finally, D.C. motors inherently require choppers and commutators which create sparks and RF pollution which can be controlled only at additional expense.

The third, and most attractive approach from the applicant's viewpoint, is an A.C. vehicle employing a battery bank and an induction motor. A.C. motors are relatively light-weight, inexpensive and efficient when compared to D.C. motors. A.C. induction motors, with no brushes or commutation, are more rugged and reliable then their D.C. counterparts and require substantially less maintenance. Related to power-to-weight ratio is the fact that A.C. machines can be driven at substantially greater speeds that D.C. motors. Because A.C. motors do not generate sparks, they can readily be employed in dusty, explosive and highly humid atmospheres or high altitudes. Additionally, A.C. motors can be liquid cooled if the application so requires. Although typically superior to D.C. motors in electric vehicle applications, A.C. motors often require complex control circuits which are dedicated to associated vehicle drivetrains. Such dedicated control circuits are inflexible, limited to performing main line control operations, and prohibit optimization of system efficiency.

It will be apparent from a reading of the specification that the present invention may be advantageously utilized in many different control applications, both mobile and fixed. However, the invention is especially useful when applied to electric powered passenger commuter vehicles, and will be described in connection therewith.

BRIEF DESCRIPTION OF THE INVENTION

The present invention provides an extremely efficient PWM inverter control apparatus that can be effectively used within electric vehicles or any system having an inverter to provide a power output to an A.C. machine at a preselectable frequency in a preselectable voltage. The control apparatus of the invention includes a control circuit which generates optimized switch command signals from parametric input signals and asynchronously transfers the signals to the inverter through a buffer which receives and stores the signals from the control apparatus at a first clocked rate and transfers the stored signals to the inverter at a second rate established by a synchronizing signal made up of the summation of signals representative of machine rotor speed and a derived slip command. This arrangement has the advantage of providing a logic network which achieves an efficient operating characteristic while being non-dedicated to the real time generation of control signals i.e., the control circuit, being able to generate optimized switch command signals at a rate substantially faster than the inverter is able to receive them can be employed to make ancillary or other sophisticated judgements during its idle time.

According to another aspect of the invention, the derived slip command is generated within the control circuit as a function of the various inputs. This arrangement facilitates the synchronization of the buffer at a rate proportional to stator frequency by summing a forced or constant slip signal with a rotor frequency signal from the motor.

According to still another aspect of the invention, the control scheme described hereinabove is applied within a drivetrain for an electric vehicle including a battery pack, an inverter and a three-phase induction motor. The application of the present invention within an electric vehicle is particularly advantageous because of the relatively high efficiencies which can be achieved over the widely varying torque and load demands.

These and other features and advantages of this invention will become apparent upon reading the following specification, which, along with the patent drawings, describes and discloses the preferred illustrative embodiment of the invention in detail.

The invention makes reference to the accompanying drawings.

BRIEF DESCRIPTION OF THE DRAWINGS

FIG. 3, represents various waveforms which are generated by the control apparatus of FIG. 2 when operated in the manner prescribed herein;

FIG. 4, is a partial block diagram of the control apparatus of FIG. 2;

FIG. 6, is a block diagram of a software routine illustrating the main control loop in which optimized switch command signals and derived slip command signals are generated;

FIG. 7, is a schematic diagram of the digital to analog converter, frequency to voltage converter and voltage controlled oscillator illustrated in FIG. 4;

FIG. 8, is a schematic diagram of the speed signal conditioning circuit of FIG. 4;

FIG. 9, is a schematic diagram of the asynchronous waveform data interface of FIG. 4; and FIG. 10, is a schematic diagram of a complimentary half of one leg of the power bridge of FIG. 5.

| ABBREVIATIONS EMPLOYED IN SPECIFICATION | |
|---|---|
| ADC | analog to digital converter |
| BSRFL | buffer shift register full |
| CALSW | calibrating waveform switch signal |
| DAC | digital to analog converter |
| EV | electric vehicle |
| FCAL | calibration frequency |
| FCSRCK | frequency of computer shift register clock |
| FINR | frequency of input rotor |
| FMSRCK | frequency of master shift register clock |
| FRS | frequency of rotor signal |
| F/V | frequency to voltage converter |
| LED | light emitting diode |
| MPX | multiplexer |
| OP AMP | operational amplifier |
| PROM | programmable read only memory |
| RAM | random access memory |
| VCO | voltage controlled oscillator |
| VDC | volts direct current |
| V/HZ | volts per hertz |

DETAILED DESCRIPTION OF THE PREFERRED EMBODIMENT OF THE INVENTION

Figure 1:
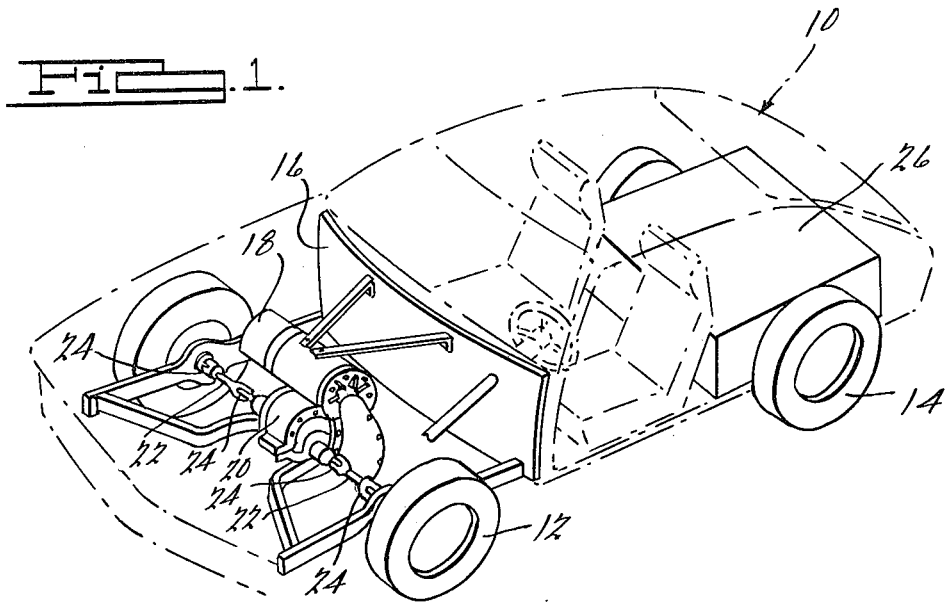
FIG. 1, is a perspective phantom view of an automobile incorporating the preferred embodiment of the present invention.

Referring to FIG. 1, packaging of the present invention within an electric vehicle (EV) 10 is conceptualized. Electric vehicle 10 is conventionally configured, having driven front wheels 12 and free rear wheels 14. An engine compartment, defined by the area forward of a firewall 16, contains a transversally mounted three-phase induction motor 18 which operates to drive wheels 12 through a two-speed transmission 20, drive shafts 22 and interconnecting u-joints 24. Motor 18 and transmission 20 are integrally formed within a common housing. The details of the front suspension have been deleted for the sake of simplicity. The mounting of motor 18 and transmission 20 as well as the independent front end suspension of ev 10 is so well known in the art so as to require no elaboration here.

A ventilated compartment 26 disposed within EV 10 behind the driver and passenger seats contains a 144 VDC battery pack as well as an inverter and most of the control circuitry. Motor 18 and compartment 26 are electrically interconnected by appropriately sized cables (not illustrated). Additionally, provision must be made to periodically connect EV 10 with a source of charging current such as at the owner's home.

The present invention can be applied to applications other than electric vehicles. FIG. 1 is intended only as an aid to the reader in conceptualizing the packaging as it would appear in a typical commuting passenger vehicle. The details of the illustrated arrangement are therefor not to be considered limiting in any sense.

Figure 2:
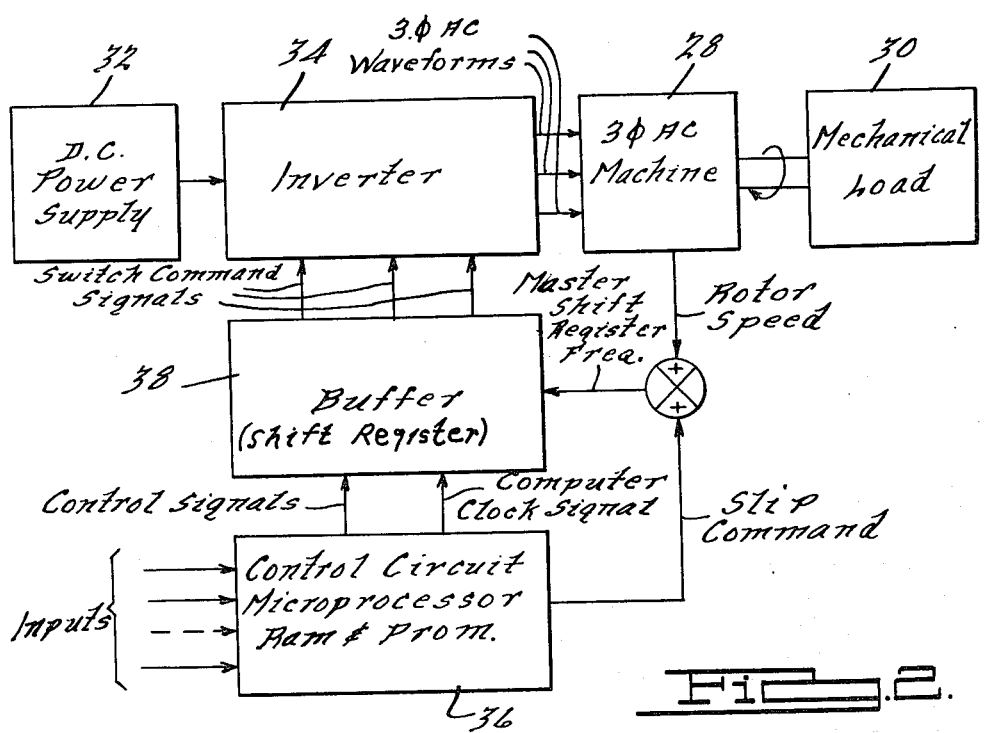
FIG. 2, is a block diagram of the pwm inverter control and its implementation within the drivetrain of the automobile of FIG. 1.

Referring to FIG. 2, a simplified block diagram of the present invention is illustrated. A three-phase A.C. machine 28 drives a mechanical load 30 and is energized by a D.C. power supply 32 through an intermediate inverter 34. Inverter 34 converts direct current from power supply 32 into three-phase A.C. waveforms. Inverter 34 receives switch command signals from a control circuit 36 through an intermediate buffer, here a shift register 38. The duty cycle and wave shape data of the three-phase A.C. waveforms are determined by the switch command signals which are derived from a plurality of parametric inputs into control circuit 36.

The circuit of FIG. 2 operates as follows. Control circuit 36, which contains a microprocessor, random access memory (RAM) and programmable read only memory (PROM), receives various parametric inputs such as voltage, current and temperature levels as well as driver torque demand in the case where the present invention is applied to EV 10. Control circuit 36 then serves to determine the optimum slip and duty cycle information for a given torque demand as a function of the inputs and look-up tables contained in memory. Control signals containing duty cycle and wave shape data are then transferred to buffer 38 at a rate determined by a clock within control circuit 36. The control signals are momentarily stored in buffer 38 while a slip command signal from control circuit 36 is summed with a signal from A.C. machine 28 representing rotor speed, resulting in a master shift register frequency signal representative of the A.C. machine stator frequency. The control signals stored in buffer 38 are then synchronized with A.C. machine 28 and transferred to inverter 34 in a form of properly phased switch command signals.

This asynchronous data transfer technique permits the microprocessor in control circuit 36 to be non-dedicated and used for ancillary purposes while not generating waveforms. Such uses, in the preferred embodiment of the invention, are the monitoring of system limits, executing drive diagnostic routines, establishing operator readout, transforming driver command into output torque commands and optimizing volts per hertz (V/HZ) during steady state conditions. The control loop operates to track the slip command. The detailed embodiment of the invention will be described in connection with an application within ev 10. A.C. machine 28 is therefore considered to correspond with three-phase induction motor 18 but it is contemplated that A.C. machine 28 could also be a regenerative absorber or the like. Likewise, mechanical load 30 represents the torque applied by and to motor 18 by ev 10.

In the generation of control signals, control circuit 36 employs the technique of waveform notching which is well known in the art and described in detail in U.S. Pat. No. 3,538,420, issued Nov. 3, 1972 to F. N. Klein and which is incorporated herein by reference. Accordingly, for the sake of brevity, the details of this technique will be omitted in this specification.

Referring to FIG. 3, the format of the notching of the three-phase waveforms is illustrated. The first three waveforms in FIG. 3 illustrate the three separate waveforms corresponding with each phase to D.C. bus common labeled $\Phi_{1(PWR)}$, $\Phi_{2(PWR)}$ and $\Phi_{3(PWR)}$ respectively. The dotted lines in the waveforms represent the middle sixty degrees of each half cycle which is the space allocated for the notches i.e., the maximum notch envelope. As is obvious to one skilled in the art, making the notches larger will reduce the percentage duty cycle or, to state it differently, if there were not notches, the duty cycle would be 100% and maximum power transferred to motor 18 would be achieved. On the other hand, if the full notch envelope were employed, the waveforms of the three-phases would be square waves in phase with one another, resulting in 0% duty cycle with no net power transfer to motor 18.

The fourth waveform in FIG. 3 shows the typical inverter leg switching waveform during operation in which two notches are symetrically disposed within the envelope in each half cycle. Control of motor 18 is therefor achieved by selectively varying the notching within the envelope such as described in U.S. Pat. No. 3,538,420. There are numerous other notching schemes than that described in U.S. Pat. No. 3,538,420. Accordingly, the present invention is not to be limited to any particular single notching scheme.

Figure 5:
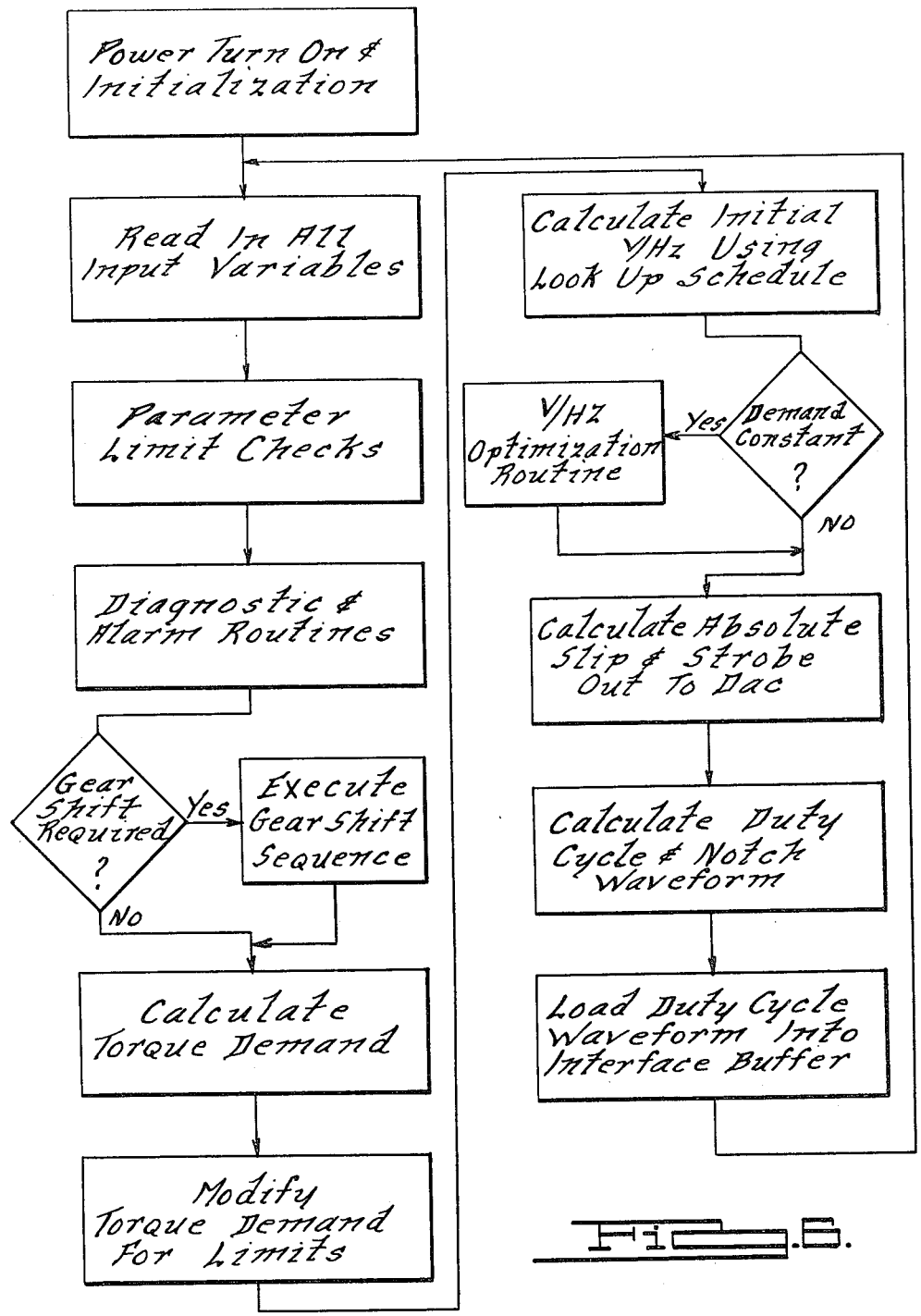
FIG. 5, is a partial block diagram, which, along with FIG. 4, expands upon the block diagram of FIG. 2.

Referring to FIGS. 4 and 5, a detailed block diagram of the present invention is illustrated. FIG. 4 generally comprises control circuit 36 and buffer or asynchronous waveform data interface 38. FIG. 5 illustrates an expanded inverter or three-phase power bridge 34, motor 18, transmission 20, and D.C. power supply or 144 vdc battery pack 32.

Referring to FIG. 4, the outputs from various temperature, current and voltage sensing transducers are connected to appropriate analog, scaling and conditioning (including zero-span where needed) circuits 40. The analog input signals from circuits 40 are connected to a 16 channel multiplexer (MPX) chip with analog to digital conversion (ADC) 42 such as that manufactured by National Semiconductor, Model ADC0816. Typical inputs received by analog scaling and conditioning circuits 40 are motor stator frequency, reference voltages, drift nulling signals, bus current, bus voltage, battery temperature, heat sink temperature, motor temperature, vehicle in motion indication, direction command, driver requested acceleration/deacceleration, brake signal, and various inputs for setting internal codes for diagnostics and displays. In addition, it is contemplated that other inputs may be desired for other applications. Accordingly, the recited inputs are not to be considered limiting.

A control bus 44 interconnects the microprocessor, RAM and PROM 46 with the MPX and ADC chip 42 as well as diagnostics and displays circuits 48, a digital to analog converter (DAC) 50 and a command decoder circuit 52. An address bus 54 and a data bus 56 likewise interconnect microprocessor 46, MPX and ADC 42, diagnostics and displays circuits 48, DAC 50 and command decoder 52.

DAC 50 operates upon command from microprocessor 46 to transmit a slip command signal to a summing junction 58. Command decoder 52, likewise upon direction from microprocessor 46 generates and routes a solenoid driver command signal to a solenoid driver 60 which, in turn, actuates a shift solenoid 62 which operates mechanically to change the gear ratio of transmission 20. Shift solenoid 62 could also be hydraulically linked to transmission 20 is it were located remotely therefrom. Command decoder 52 also operates to transmit microprocessor generated forward/reverse phase shift signals and master inhibit-shutdown signals to interface 38. Command decoder 52 is effectively operating as an output latch for output control signals. Finally, command decoder 52 operates to transmit a calibrating frequency switch signal (CALSW) which is directed to a speed signal conditioning circuit 64.

Speed signal conditioning circuit 64 selectively passes a speed signal representative of input rotor frequency (FINR) derived from a speed pickup or tach 66 on motor 18 or a frequency calibration signal (FCAL) from a local oscillator 68. The output of speed signal conditioning circuit 64 is a scaled rotor frequency signal (FRS) which passes through a frequency to voltage (F/V) converter 70 to summing junction 58. Summing the slip command and converted FRS signals will result in an output signal from summing junction 58 whose voltage is proportional to stator frequency. This signal is passed to a voltage controlled oscillator 72, the output of which is a frequency representing a multiple of the motor stator frequency which will be referred herein as the frequency master shift register clock signal (FMSRCK) which is an input to interface 38. Serial duty cycle data is input to interface 38 directly from data bus 56. Separate control lines interconnect microprocessor 46 with interface 38, passing frequency of computer shift register clock (FCSRCK) and buffer shift register full (BFRSL) information to interface 38. An additional interrupt line connects interface 38 with microprocessor 46.

Interface 38 has three twisted output pairs labeled $\Phi_1$ and $\overline{\Phi}_1$, $\Phi_2$ and $\overline{\Phi}_2$ and $\Phi_3$ and $\overline{\Phi}_3$ which passes the synchronized and phased serial duty cycle data to three $\Phi$ power bridge (inverter) 34 illustrated in FIG. 5. Each of the output pairs of interface 38 connect to one of the three legs or portions within bridge 34. It should be remembered that the preferred embodiment is intended to be illustrative only and that a motor of other than three phases could be employed within the scope of the present invention.

Because the circuitry within each of the three legs within power bridge 34 is identical with the others, the details of only one will be disclosed. Referring to FIG. 5, inputs for the first leg from interface 38 are both connected to isolation circuits 71, and 74, each of which, in turn, are connected to complimentary gate drive logic circuits 76 and 78 respectively. Gate drive logic circuits 76 communicates with logic circuit 78 through an isolation circuit 80 and gate drive logic circuit 78 communicates with logic circuit 76 through a second isolation circuit 82. Separate bi-polar switching power supplies 84 and 86 supply power to gate drive logic circuits 76 and 78 respectively. The output of gate drive circuits 76 and 78 are connected to drivers 88 and 90 respectively which are also powered by power supplies 84 and 86 respectively. The output of drivers 88 and 90 are connected to the control inputs of power switches 92 and 94 respectively. A positive power bus 96 from battery pack 32 is connected to power supply 84 and power switch 92. A negative bus 98 from battery pack 32 is connected to power supply 86 and power switch 94. Power switches 92 and 94 each have current and voltage sensing elements which are electrically connected gate drive logic circuits 76 and 78 respectively. The power output terminals of power switches 92 and 94 are commonly connected to one leg or coil of a wye connected motor 18. An additional output from each power switch 92 and 94 is connected an energy recovery circuit 100 which returns energy that would otherwise be lost during the collapse of inductive fields to busses 96 and 98. Each leg within power bridge 34 comprises two complimentary halves consisting of isolation circuit 71 (74), gate drive logic circuit 76 (78), power supply 84 (86), driver 88 (90), isolation circuit 80 (82) and power switch 92 (94). Gate drive logic circuits 76 and 78 are arranged so as to permit turning "on" only one power switch 92 or 94 at a time. If both power switches 92 and 94 were on simultaneously, a direct short would result between busses 96 and 98. This condition is not permissable and steps are taken to prevent such an occurrence.

The output shaft of motor 18 is connected to transmission 20 which, in turn, drives wheels 12 through differential gearing 20$_a$ which in FIG. 1 is integrally housed with transmission 20 and motor 18.

The 144 VDC battery pack 32 comprises 12 volt automotive batteries which are connected electrically in series to busses 96 and 98 through a manually operated contactor 102 and an input filter 104. In-line fuses 106 and 108 are installed in busses 96 and 98 respectively. The output terminals of contactor 102 are also connected to an auxiliary inverter, rectifier and regulator circuit 110 through in-line fuses 112 and 114. The output of regulator circuit 110 is connected to a logic and analog power supply 116 which provides a +5, ±15 outputs referenced to analog tie point 118 as well as an output logic voltage terminal and a reference digital common tie point 120. A conventional supplemental 12 VDC starting lighting and ignition (SLI) battery 122 is also electrically connected to the input of power supply 116 to supply accessory vehicle loads.

Referring to FIG. 6, a flow diagram of the main control loop algorithm is illustrated. After contactor 102 is closed and power is established, and microprocessor 46 is initialized, all input variables from transducers are read in the memory and parameter limit checks are made. Such tests would include temperatures over limit, over speed condition, excessive current levels and over-/under bus voltage. At that point, any diagnostic and alarm routines are executed. Torque demand is then calculated from the operator controlled input and resulting demand modified if predetermined limits are exceeded. In such a case a large step demand for increased torque would be incrementally applied over a period of time. Once an in limit torque demand is established, an initial volts per hertz (V/HZ) ratio is calculated employing look-up tables established by the physical characteristics of motor 18 and stored in memory. If the torque demand made by the driver is constant or below a predetermined threshold, an ancillary V/HZ optimization routine is initiated to fine tune the V/HZ ratio to optimize overall operating efficiency i.e., to minimize bus current for given steady state conditions. Once the demand is determined to be not constant, microprocessor returns to the main program to calculate slip as a function of the product of the motor constant and torque demand divided by the square of V/HZ. This value is strobed out to DAC 50. Next, the duty cycle and notch waveform is optimally claculated to form the best comprimise between transistor switching rate constraints and harmonic losses due to the fact that the waveform is not sinusoidal. A detailed example of one method of so calculating duty cycle and notch wave forms is disclosed in U.S. Pat. No. 3,538,420. Briefly, the following steps are taken. The average motor line voltage is calculated from V/HZ and stator frequency data. Next, the optimum number of notches per notch envelope within each half cycle of the phase voltage waveforms is determined. The duty cycle is then calculated by dividing the average voltage by the bus voltage. Finally, the actual shape of the pulse waveform is determined using the above determined duty cycle and notch number information. This information is then loaded into interface 38 and the cycle completed by rereading all input variables.

As an additional feature, when a two or more speed transmission 20 is employed, a gear shifting function must be inserted in the above described routine. A convenient place would be immediately after execution of the diagnostic and alarm routines wherein as a function of motor and vehicle speed, operator input (torque demand) and stored constants, a gear shift requirement question would be posed which if answered negatively would continue the program and if answered affirmatively would cause the execution of the gear shift sequence prior to returning to the main program. The gear shift sequence comprises temporarily suspending torque demand from the operator and placing the motor under the full control of the processor (internal demand) during which a new set of shift speed ratios are established and finally, the actual gear shift execution is made. Subsequently, driver torque demand is re-established as an input.

Referring to FIG. 7, a detailed schematic diagram of DAC 50, F/V converter 70 and voltage control oscillator circuit 72 is illustrated. Note that terminal designations by roman numeral refer to the specific referenced integrated circuit and that it is contemplated that other equivalent circuits can be substituted. Data bus 56 is connected to terminals II through IX of DAC 50 which is of the type marketed by Signetics, Model NE5018. A single line from address bus 54 is connected to one of the inputs of a nand gate 124, the output of which is connected to terminal X of DAC 50. One line of control bus 44 is connected to both inputs of a nand gate 126 the output of which is connected to the remaining input of nand gate 124. Terminal I of DAC 50 is connected to tie point 120. Terminal XXII of DAC 50 is connected to tie point 118. Terminals XX and XV of DAC 50 are commonly connected to tie point 118 through a back biased diode 128. Terminal XVIII of DAC 50 is connected to tie point 118 through a 4.7 k ohm resistor 130 and to terminal XX through a 470 picofarad capacitor 132. Terminal XX of DAC 50 is also connected to terminal XXI through a 1000 picofarad capacitor 134. Terminals XVII and XVI of DAC 50 are interconnected by a 0.1 microfarad capacitor 136. Terminal XVII of DAC 50 is connected directly to the −15 VDC regulated power supply 116 and to tie point 118 through a 0.1 microfarad capacitor 138. Terminal XIX of DAC 50 is connected directly to the +15 VDC regulated power supply 116 and interconnected to tie point 118 through a 0.1 microfarad capacitor 140. Terminals XIII and XIV of DAC 50 are commonly connected to the +5 VDC regulated power supply 116 and interconnected to tie point 118 through the fixed resistor portion of a 10 k ohm trim potentiometer 142. The wiper of potentiometer 142 is connected to terminal XII of DAC 50 through a 71.5 k ohm resistor 144.

Terminal XVIII of DAC 50 is the output carrying slip command signals and is electrically interconnected to terminal I of F/V converter 70 through a series combination of the fixed resistor portion of a 500 k ohm potentiometer 146 and a 234 k ohm resistor 148. The wiper of potentiometer 146 is electrically connected to the common tie point of potentiometer 146 and a resistor 148. F/V converter 70 is of the type manufactured by Burr-Brown type VFC32KP. Potentiometer 146 serves to calibrate the output of DAC 50.

Terminal I of F/V converter 70 is connected to the wiper of a 10 k ohm potentiometer 150 through a 3.8 meg ohm resistor 152. The fixed terminals of potentiometer 150 are connected to the +15 VDC and −15 VDC power supply 116. Potentiometer 150 thereby serves as a zero calibration trimmer which eliminates any offset error which otherwise would be significant because slip is a relatively small percentage of the rotor frequency signals. The FRS signal is fed to the input terminal X of F/V converter 70 through a 470 picofarad coupling capacitor 154. Terminal X of F/V converter 70 is also connected to tie point 118 through a 4.7 k resistor 156 and to the +15 VDC power supply 116 through a parallel combination of a reverse biased diode 158 and a 22 k ohm resistor 160. Terminal XII of F/V converter 70 is connected directly to the +15 VDC power supply 116 and to tie point 118 through a 0.01 microfarad capacitor 163. Output terminal XIII of F/V converter 70 is connected to terminal I of VCO 72 through a 33.2 k ohm resistor 162 and to terminal I of F/V converter 70 through a 0.0056 microfarad capacitor 164. A series combination of a 30.1 k ohm resistor 166 and the fixed terminals of a 20 k ohm span trim potentiometer 168 is connected in parallel with capacitor 164. Output terminal V of F/V converter 70 is connected to tie point 118 through a 1800 picofarad capacitor 170.

The summed outputs of F/V converter 70 and the slip command signal are passed into VCO 72 at its terminal I. VCO 72 is of the type manufactured by Burr-Brown type VFC32KP. Terminal I of VCO 72 is also commonly connected to terminals X and XIII of VCO 72 through a 1000 picofarad capacitor 172. Terminal IV of VCO 72 is directly to the −15 VDC power supply 116 and interconnected to tie point 118 through a 0.01 microfarad capacitor 174. Terminals XI and XIV of VCO 72 are directly connected to tie point 118 and terminal V of VCO 72 is interconnected to tie point 118 through a 150 picofarad capacitor 176. Terminal XII of VCO 72 is directly connected to the +15 VDC power supply 116 and to tie point 118 through a 0.01 microfarad capacitor 178. Output terminal VII of VCO 72 is connected to the +5 VDC power supply 116 through a 1 k ohm current limiting resistor 180. The signal at the output terminal VII of VCO 72 is FMSRCK which passes onto interface 38.

Referring to FIG. 8, a detailed schematic diagram of speed pickup 66 and associated speed signal conditioning circuit 64 is illustrated. A sixty tooth rotor gear 182 is mounted for rotation with the rotor of motor 18. A magnetic pickup sensor 184 is mounted to the stator of motor 18 adjacent the teeth of gear 182. Sensor 184 is of the type manufactured by Electro, Model 301-AN which operates to sense the passing teeth and thereby derive a signal representative of motor rotor speed. A pair of twisted leads from pickup 184 are interconnected to the + and − input of an op amp 186 through a series combination of two 56 k ohm resistors 188 and 190 and a single 56 k resistor 192 respectively. Op amp 186 is also electrically connected to tie point 118 and to the +5 VDC power supply 116. The point of common connection between resistors 188 and 190 is connected to the negative input of op amp 186 through a 100 picofarad capacitor 194. The positive and negative inputs of op amp 186 are also interconnected by a pair of anti-parallel diodes 196 and 198.

The output of op amp 186 is connected to the +5 VDC power supply 116 through a 4.7 k ohm biasing resistor 200 and to the positive input terminal of op amp 186 through a 750 k ohm feed back resistor 202. The output of op amp 186 goes to one input of each of two exclusive nor gates 204 and 206.

The FCAL signal is transmitted on a line from local oscillator 68 which is connected to one input of a nand gate 208 through a 22 k ohm resistor to 210. The output of nand gate 208 is commonly tied to the other two inputs of exclusive nor gates 204 and 206. CALSW signal is carried on a line from command decoder 52 which is connected to both inputs of a nand gate 212 through a 22 k ohm resistor 214. The input line from command decoder 52 is also connected to the +5 VDC power supply 116 through a 4.7 k ohm resistor 216. The output of nand gate 212 is connected to the remaining input of nand gate 208 and interconnected to the positive input of op amp 186 through a diode 218.

The output of exclusive nor gate 206 is connected to one input of another exclusive nor gate 220 through a 22 k ohm resistor 222. The other terminal of exclusive nor gate 220 is connected to tie point 120. The two input terminals of an exclusive nor gate 220 are interconnected by a 470 picofarad capacitor 224. The outputs of exclusive nor gates 204 and 220 are connected to the two inputs of an exclusive nor gate 221 whose output carries the FRS signal to F/V converter 70. Nand gate 208 operates to switch in the FACL and CALSW signals. The exclusive nor gates and the associated circuitry act as a frequency doubler.

Referring to FIG. 9, a detailed schematic diagram of interface 38 is illustrated. A line from data bus 56 carrying serial duty cycle date is connected to input terminal II of buffer shift register 226 which is of the type manufactured by Synertek, Model SYP2534. Buffer shift register 226 is ganged with two identical buffer shift registers 228 and 230, terminal III of buffer shift register 226 being connected with terminal VII of buffer shift register 228 and terminal VI of buffer shift register 228 being connected with terminal II of buffer shift register 230. Terminal IV of buffer shift register 226 is directly connected to digital tie point 120 while terminal III of buffer shift register 126 is interconnected to tie point 120 through a 470 picofarad capacitor 232. Terminals VIII of I of buffer shift register 226 are connected to the +5 VDC power supply 116. Terminal VI of buffer shift register 228 is connected to tie point 120 through a 400 picofarad capacitor 234. Terminal V of buffer shift register 228 and terminal V of buffer shift register 230 are commonly connected to the output terminal of a nand gate 236. Terminals I and VIII of buffer shift register 230 are connected to the +5 VDC power supply 116.

The line interconnecting microprocessor 146 and interface 38 which carries the FCSRCK signal actually comprises two conductors, one of which is connected to both inputs of a nand gate 238 and one of the inputs of another nand gate 240. The other line carrying the FCSRCK signal connects to one of the inputs of a nor gate 242. The output of nand gate 238 is connected to the other input of nor gate 242.

The line carrying the BSRFL signal from microprocessor 46 to interface 38 also comprises two conductors both of which terminate in the inputs of a nor gate 244. The output of nor gate 244 connected to the remaining input of nand gate 240. The output of nor gate 242 is connected to an input of a nand gate 246 the output of which is connected to one input of nand gate 236. The output of nand gate 240 is connected to one of the inputs of a nand gate 248 whose output is connected to one of the inputs of another nand gate 250. The output of nand gate 250 is connected to the remaining input of nand gate 248. This arrangement of gates comprises a latch, the operation of which is well known in the art. The output of nand gate 248 is also connected to one of the inputs of a nand gate 252.

The line transmitting the FMSRCK signal from VCO circuit 72 to interface 38 terminates in terminal X of a type 4040 twelve stage binary divider 254. Terminal XIV of divider 254 is connected to one input of a nand gate 256. Terminal XV of binary divider 254 is connected to the other input terminal of nand gate 256. The output of nand gate 256 is commonly connected to both inputs of another nand gate 258. Terminal VIII of divider 254 is connected to tie point 120 and terminal XVI of divider 254 is connected to the +5 VDC power supply 116. The output of nand gate 258 is connected to the remaining input of nand gate 252 and to tie point 120 through a series combination of a 6.8 k ohm resistor 260 and a 100 picofarad capacitor 262. The point of common connection between resistor 260 and capacitor 262 is connected to terminal XI of divider 254.

The output of nand gate 252 is connected to an input of another nand gate 264 the output of which is connected to one of the inputs of another nand gate 266. The output of nand gate 266 is connected to the remaining input of nand gate 264, forming another latch. The output of nand gate 266 is connected to the remaining input of nand gate 250. The output of nand gate 258 is also connected to one of the inputs of another nand gate 268. The output of nand gate 268 is connected to the remaining input of nand gate 266. The remaining input of nand gate 268 is connected to tie point 120 through a 0.01 microfarad capacitor 270 and to the output of nand gate 264 through a 22 k ohm resistor 272.

The output of nand gate 268 is connected to one input of another nand gate 274 the output of which is connected to an input of another nand gate 276. The output of nand gate 276 is connected to the remaining input terminal of nand gate 274 to form an interrupt latch. The output of nand gate 276 is electrically connected to microprocessor 46 carrying the interrupt signal. The output of nor gate 242 is also connected to both inputs of another nor gate 278 whose output is connected to the remaining input of nand gate 276. The output of nand gate 264 is connected to both inputs of a nand gate 280, one input of a nand gate 282 one input of another nand gate 284 and both inputs of still another nand gate 286. The output of nand gate 280 is connected to the remaining input of nand gate 246. The output of nand gate 282 is connected to the remaining input of nand gate 236. The remaining input of nand gate 282 is connected to terminal X of divider 254. The output of nand gate 284 is connected to an input of another nand gate 288. The output of nand gate 286 is connected to an input of another nand gate 290 the output of which is connected to the remaining input of nand gate 288.

The output terminal of nand gate 288 is connected to tie point 120 through a 470 picofarad capacitor 292 to an input terminal II of master shift register 294 which is ganged with two identical registers 296 and 298 much the same as were buffer shift registers 226, 228 and 230. Terminal III of master shift register 294 is connected to terminal VII of master shift register 296. Terminal VI of master shift register 296 is connected to terminal II of master shift register 298. Terminal III of master shift register 298 is connected to the remaining input of nand gate 290. Terminals I and VIII of master shift register 296 and terminals I and VII of master shift register 298 are connected to the +5 VDC power supply 116. Terminal IV of master shift register 294 is directly connected to tie point 120. Terminal III of master shift register 294 is interconnected to tie point 120 through a 470 picofarad capacitor 300. Terminal V of master shift register 294 and terminal V of master shift register 298 are connected to terminal X of divider 254. Terminal VI of master shift register 296 is connected to tie point 120 through a 470 picofarad capacitor 302. A 0.01 microfarad capacitor 304 is interconnected between the +5 VDC power supply 116 and tie point 120 locally at each type 74L500 IC and each type SYP2534 IC device.

Terminal II of master shift register 294 is connected directly to one input of a nand gate 306 and interconnected to an input of another nand gate 308 through an inverter 310. The output of nand gate 306, paired with a reference line connected to the +5 VDC power supply 116 through a 200 ohm resistor 312 carries the switch command signal to leg one of the three Φ power bridge 34. The output of nand gate 308, paired with another reference line connected to the +5 VDC power supply 116 through a 200 ohm resistor 314 comprises the complement signal to leg one of power bridge 34.

Terminal VII of master shift register 296 is connected to one input of nand gate 316 and one input of another nand gate 318. Terminal II of master shift register 298 is connected to one input of a nand gate 320 and one input of another nand gate 322. The line from command decoder 52 carrying the forward/reverse Φ-shift signal is connected directly to the remaining input terminals of nand gate 316 and 320 and interconnected to the remaining input terminals of nand gates 318 and 322 through an inverter 324. The output of nand gate 316 is connected to one input of a nand gate 326 and the output of nand gate 322 is connected to the remaining input of nand gate 326. The output of nand gate 318 is connected to one input of a nand gate 328 and the output of nand gate 320 is connected to the remaining input of nand gate 326 is connected directly to one input of a nand gate 330 and indirectly to one input of another nand gate 332 through an inverter 334. Likewise, the output of nand gate 328 is directly connected to one input of a nand gate 336 and indirectly to an input of another nand gate 338 through inverter 340. The output of nand gate 330, paired with a reference line connected to the +5 VDC power supply 116 through a 200 ohm resistor 342 is connected to leg two of power bridge 34. The output of nand gate 332, coupled with a reference line connected to the +5 VDC power supply 116 through a 200 ohm resistor 344 are also connected to the second leg of power bridge 34. The output of nand gate 336, coupled with a reference line connected to the +5 VDC power supply 116 through a 200 ohm resistor 346 is connected to leg three of power bridge 34 and the output of nand gate 338 coupled with a reference line connected to the +5 VDC power supply 116 through a 200 ohm resistor 348 is also connected to leg three of power bridge 34.

The output nand gate 240 is connected to both inputs of a nand gate 350 the output of which is connected to both inputs of nand gates 352 and 354 through a forward biased diode 356. The inputs of nand gates 352 and 354 are also connected to tie point 120 through a parallel combination of a 10 meg ohm resistor 358 and a 0.0068 microfarad capacitor 360. The output of nand gates 352 and 354 are commonly interconnected to both inputs of a nand gate 362 through a series combination of a 2.2 k ohm resistor 364 and a reverse biased diode 366. The inputs to nand gate 362 are also interconnected to the +5 VDC power supply 116 through a 1.5 meg ohm resistor 368 and to tie point 120 through a 0.33 microfarad capacitor 370. The output of nand gate 362 is interconnected with both inputs of a nor gate 372 through a 2.2 k ohm resistor 374. The input terminals of nor gate 372 are connected to the +5 VDC power supply 116 through a parallel combination of a 330 k ohm resistor 376 and a reverse biased diode 378. The inputs of nor gate 372 are connected to tie point 120 through a parallel combination of a 1 microfarad capacitor 380 and a single pole single throw switch 382. The output of nor gate 372 is connected to both inputs of a nand gate 384 the output of which is connected to one of the inputs of a nand gate 386. The output of nand gate 386 is commonly interconnected to the remaining inputs of nand gates 306, 308, 330, 332, 336 and 338 through an inverter 388. The line carrying the master inhibit-shutdown signals from command decoder 52 is connected to both inputs of a nand gate 390 and interconnected to the +5 VDC power supply 116 through a 4.7 k ohm resistor 392. The output of nand gate 390 is connected to the remaining input of nand gate 386.

In operation, interface 38 serially receives duty cycle data from the control circuit 36 (data bus 56) and temporarily stores that data in buffer shift registers 226, 228 and 230. Circuitry associated with gates 266, 264, 268, 248, 250, 280, 264, 236, 288, 290, 284, 286, 242, 238, 244 and 240 operates as pulse steering gates which transfer the serial duty cycle data from the buffer shift registers 226, 228 and 230 to the master shift registers 294, 296 and 298. Divider 254, gates 256, 258 and 252 along with associated discrete circuitry, operate as a sync detector whereby switch command signals are gated from gates 306, 308, 330, 336 and 338 at a rate synchronized with motor 18. Gates 384, 386 and 390 function to inhibit the driver gates upon receiving a master inhibit-shutdown signal. Gates 316, 322, 318, 320, 326 and 328 provide the forward/reverse feed logic. Diode 378, resistor 376, capacitor 380 and switch 382 provide a reset circuit which is automatic upon power-up of the control circuit and can be manually initiated via switch 382. Finally, a failsafe shutdown system is provided via gates 350, 352, 354, 362 and their associated circuitry which inhibit the drive gates if a timely update command is not received.

Referring to FIG. 10, a schematic diagram of the top half of leg one of three Φ power bridge 34 is illustrated. The top half of leg one is defined as being that receiving the $\Phi_1$ signal from interface 38 and the bottom half is defined as that portion receiving the inverse signal $\overline{\Phi}_1$ from interface 38. The complementary (bottom) circuit portion of leg one of power bridge 34 is substantially identical to that disclosed in FIG. 10 and is deleted for sake of brevity. In addition, the schematic and operation of the circuits contained in legs 2 and 3 of power bridge 34 are identical to that of leg one.

The output of interface 38 carrying the $\Phi_1$ information is connected to the input terminals of an optical coupler 394 within leg one of power bridge 34. Optical coupler 394 is of the type manufactured by Hewlett-Packard, Model HP5082-4351 and corresponds with isolation circuit 71 in FIG. 5. The photo diode output of optical coupler 394 is connected to a $+V_L$ (logic) power supply. The emitter terminal of optical coupler 394 is connected to a logic common tie point 396. The collector output terminal of optical coupler 394 is interconnected with power supply $+V_L$ through a 3.3 k ohm resistor 398 and interconnected with both inputs of a nand gate 400 through a 22 k ohm resistor 402. The output of nand gate 400 is connected to both inputs of nand gate 400 through a 100 k ohm resistor 406. Gates 400 and 404 and resistors 402 and 406 comprise a Schmidt trigger, the operation of which is well known in the art. The output of nand gate 404 interconnected to one of the inputs of another nand gate 408 through a 100 picofarad coupling capacitor 410. The output of nand gate 408 is connected to one input of another nand gate 412 the output of which is connected to the remaining input of nand gate 408. The output of nand gate 408 is also connected to one of the four inputs of a type 4012 nand gate 414. The input of nand gate 408 connected to capacitor 410 is also connected to the $+V_L$ power supply through a 56 k ohm resistor 416. The remaining input of nand gate 412 is interconnected with $+V_L$ power supply through a series combination of a 22 k ohm resistor 418 and an 820 ohm resistor 420. Nand gates 408 and 412 comprise an over current latch. The output of nand gate 400 is connected to another input of nand gate 414 and to both inputs of a nand gate 422. The output of nand gate 422 is connected to $+V_L$ power supply through a series connected 220 ohm resistor 424 and a light emitting diode (LED) 426. Nand gate 422, resistor 424 and LED 426 comprise a diagnostic circuit which will energize LED 426 should the input voltage level of nand gate 422 rise above $V_L/2$.

A second optical coupler 428 has its LED input connected to the complementary gate circuit 78 (see FIG. 5). The photo diode output terminal of optical coupler 428 is connected to the $+V_L$ power supply and the emitter output terminal is connected to tie point 396. The collector terminal of optical coupler 428 is interconnected with $+V_L$ power supply through a 3.3 k ohm resistor 430 and interconnected to both inputs of a nand gate 432 through a 22 k ohm resistor 434. The output of nand gate 432 is connected to both inputs of another nand gate 436 whose output is interconnected to the inputs of nand gate 432 through a 100 k ohm resistor 438. Nand gates 432 and 436 and resistors 434 and 438 comprise a Schmidt trigger. The output of nand gate 432 is connected to one of the remaining inputs of nand gate 414 and to both inputs of a nand gate 440. The output of nand gate 440 is interconnected to $+V_L$ power supply through a series connected 220 ohm resistor 442 and LED 444. Nand gate 440, resistor 442 and LED 444 constitute a diagnostic test circuit. Optical coupler 428 is the equivalent of isolation circuit 80 in FIG. 5.

Power switch 92 as illustrated in FIG. 5 comprises a series connected snubber inductor (not illustrated) and a power transistor 446. Also included are voltage and current sensing circuits. Finally, an output to energy recovery circuit 100 is also embodied within power switch 92. The details of the snubber and energy recovery circuit are the subject of a copending application referenced hereinabove. During the portion of the cycle of operation in which transistor 446 is conductive, the heavy current flow is through positive bus 96, the snubber inductor, transistor 446 and $\Phi_{1(PWR)}$ output line. During this period, the complementary power transistor within leg one is in the non-conductive state. In the portion of the cycle which transistor 446 is not conductive, the complementary power transistor in leg on may be conductive. In that case, the heavy current will be through the minus bus 98, the complementary snubber inductor and the complementary transistor.

Sensing of the collector current within power transistor 446 is accomplished by a magnetic circuit comprising two ferrite core pieces 448 and 450 and a hall effect switch 452 which is of the type manufactured by Sprague, Model UGS3019T. The collector lead of power transistor 446 is passed through a gap between ferrite core pieces 448 and 450 which is calibrated and adjusted to cause switch 452 to open or close at a predetermined collector current level. The positive terminal of switch 452 is connected to the $+V_L$ power supply and the negative terminal is connected to tie point 396. The neutral terminal of switch 452 is connected to the point of common connection between resistors 420 and 418. The leads from switch 452 are shielded and the shield is connected to tie point 396.

The voltage level of the collector of power transistor 446 is measured through a lead which is interconnected to the non-inverting terminal of an op amp 454 through a series combination of a 6.8 k ohm resistor 456 and a 100 ohm resistor 458. The point of common connection between resistors 456 and 458 is connected to tie point 396 through a diode 460. The shielded lead from the collector of power transistor 446 is also interconnected with the inverting input of another op amp 462 through a 232 k ohm resistor 464. The shield of the voltage lead is also connected to tie point 396. The inverting input of op amp 454 is connected to tie point 396 through a 10 k ohm resistor 466. The inverting input of op amp 454 is also connected to tie point 396 through a series connected 18 k ohm resistor 468 and a diode 470. The point of common connection between resistor 468 and diode 470 is connected to a $-V_B$ power supply through a 1 k ohm resistor 472. The output of op amp 454 is connected to its non-inverting input through a 150 k ohm resistor 474. The output of op amp 454 is interconnected with a node designated A through a 3 k ohm resistor 476. Node A is directly connected to the remaining input of nand gate 414 and to two of the four inputs of a nand gate 478. Finally, node A is connected to the $+V_L$ power supply through a 4.7 k ohm resistor 480.

The inverting input of op amp 462 is connected to tie point 396 through a 16.5 k ohm resistor 482. The non-inverting input of op amp 462 is connected to tie point 396 through a 16.5 k ohm resistor 484 and to the $+V_L$ power supply through a 16.5 k ohm resistor 486. The output of op amp 462 is connected to the $+V_L$ power supply through a 4.7 k ohm resistor 488 and commonly to the two remaining inputs of nand gate 478 through a parallel combination of a 15 k ohm resistor 490 and a forward biased diode 492. The two inputs to nand gate 478 associated with op amp 462 are also connected to tie point 396 through a 1000 picofarad capacitor 494. The output of nand gate 478 is connected to the base of a type 2N3414 transistor 496. The emitter of transistor 496 is interconnected to tie point 396 through a 390 ohm resistor 498. The collector of transistor 496 along with a lead from the $+V_L$ power supply are connected to complementary isolation circuit 80 (refer to FIG. 5).

The output terminal of nand gate 414 is interconnected with terminals I, II, VI and VII of a buffer 500 through a 20 k ohm resistor 502. Buffer 500 is of the type manufactured by National Semi-Conductor, Model 8632N. Terminal IV of buffer 500 is connected directly to the $-V_B$ power supply and interconnected with terminal VIII of buffer 500 through a series combination of a 10 k ohm resistor 504 and a 4.7 microfarad capacitor 506. Terminal I of buffer 500 is interconnected with the point of common connection between resistor 504 and capacitor 506 with a reverse biased diode 508. Terminal I of buffer 500 is interconnected to the $-V_B$ power supply through a 30 k ohm resistor 510. Terminal VIII of buffer 500 is connected to the $+V_B$ power supply. Terminals III and V are commonly interconnected to a node B through a 10 ohm resistor 512. Node B is connected to the $+V_B$ power supply through a 30 ohm resistor 514 and directly to the base of a type D44H2 transistor 516 of the type manufactured by General Electric Corporation. The collector of transistor 516 is interconnected to the $+V_B$ power supply through a 0.40 ohm resistor 518. The emitter of transistor 516 is connected, through one lead of a twisted pair to the base terminal of power transistor 446 which is of the type manufactured by Toshiba, Model 2SD648. The emitter of transistor 516 is also connected to the emitter of a transistor 520 which is of the type manufactured by General Electric, type D45H2. The collector of transistor 520 is connected to the $-V_B$ power supply. The base of transistor 520 is connected to its emitter through a diode 522 and to node B through a parallel combination of a 680 ohm resistor 524 and a series connected 56 ohm resistor 526 and a 0.47 microfarad capacitor 528. The other lead in the twisted pair interconnects the emitter of transistor 446 with a power common tie point 530. Finally, a type GEA397 fly back diode 532 interconnects the collector and emitter of transistor 446.

The dual switching power supply 84 supplies only the circuit illustrated in FIG. 10. Five other identical power supplies are provided to individually power the complementary circuit in leg one as well as the circuits in legs two and three. Power supply 84 has output terminals $+V_B$ and $-V_B$. The level of those voltages will depend upon the specific components used in an implementation of the present invention. Power supply 84 also has common connections to tie points 396 and 530. The $+V_L$ power source is derived from a 13 volt unregulated tap from power supply 84 which is connected to terminal I of a type SG7808C regulator 534. Output terminal II of regulator 534 is connected to tie point 396 through a 47 microfarad capacitor 536 and represents the output terminal $+V_L$. Terminal II of regulator 534 is also connected to tie point 396 through a series combination of a 470 ohm resistor 538 and a LED 540. LED 540 serves as a diagnostic aid. Output terminal III of regulator 534 is connected to tie point 396. The plus and minus busses 96 and 98 provide electrical energy to power supply 84. Note that only one half of power supply 84 is illustrated. The other half provides a $+V_B$, $-V_B$ and referenced tie points 396 and 530 to the complementary base drive circuit within leg one while maintaining a large breakdown voltage isolation between the two supplies.

In operation, the circuit of FIG. 10 receives the switch command signals pertaining to phase one of motor 18 from interface 38. This is isolated from the gate drive logic 76 by optical coupler 394. The output from optical coupler 394 is passed through a Schmidt trigger to clean up the waveform and provide sharp transistions. The output of the Schmidt triggers is fed directly to a four input gate and coupled as a reset into a overcurrent latch which is set via the current sensing lines operating on pull up resistor 420. The output of the current latch is also fed to gate 414. An enabling signal from the complementary gate drive circuit is first isolated by optical coupler 428, passed through a Schmidt trigger and then fed into an input of gate 414. Finally, op amp 454 operates as a comparator to sense the power transistor voltage and transmit an inhibit signal to gate 414. The output of gate 414 controls the operation of power transistors 446 through buffer 500 and its associated circuitry. Thus, in order for transistor 446 to become conductive, the following four outputs must be received be gate 414: (1) command from microprocessor 46, (2) enable signal from complementary gate drive 78, (3) overcurrent latch reset and, (4) no negative current sensed through fly back diode 532.

Capacitor 528 and resistor 526 operate to provide a low resistance path during the turn off of power transistor 446. Resistors 456 and 458 along with diode 460 provide a level shift and protective clamp for op amp 454. Diode 508, resistor 504, and capacitor 506 constitute a power-on reset circuit. The output of op amps 454 and 462 are passed through gate 478 to the complementary gate drive logic 78 through isolation circuit 80. This arrangement assures that both power transistors in a single leg will never be in the conductive state at the same time.

It is to be understood that the invention has been described with reference to a specific embodiment which provides the features and advantages previously described, and that such specific embodiment is susceptible of modification, as will be apparent to those skilled in the art. It is also to be understood that although described in the environment of an electric vehicle, in its broadest sense, the present invention can be adapted for other applications. Accordingly, the foregoing description is not to be construed in a limiting sense.

What is claimed is:

1. A control apparatus for use with an inverter of the type which provides a PWM power output to an A.C. induction machine at a preselectable frequency and a preselectable voltage from a substantially fixed D.C. bus, said A.C. machine having characteristic stator and rotor frequencies associated therewith, said control apparatus comprising:
   a control circuit operative to receive a plurality of parametric inputs and to generate optimized switch command signals at a first rate established by a clock independent of said stator and rotor frequencies; and
   shift register means operative to receive and store said switch command signals and to transfer said signals to the inverter at a second rate established by a synchronizing signal which is a function of the summation of signals representative of machine rotor speed and a derived slip command.

2. The apparatus of claim 1, wherein said inverter has an input from a substantially filed D.C. power supply and said parametric inputs comprise D.C. bus voltage and current.

3. The apparatus of claim 1, wherein said derived slip command is generated within said control circuit as a function of said parametric inputs.

4. The apparatus of claim 1, wherein said A.C. machine is a three-phase induction motor.

5. The apparatus of claim 1, wherein one of said inputs comprises an operator torque demand signal.

6. The apparatus of claim 1, wherein said shift register means comprises first storage means operative to serially receive and store said switch command signals and second storage means operative to periodically receive and store said stored signals from said first storage means.

7. The apparatus of claim 6, wherein said shift register means further comprises logic means operative to transmit signals stored in said second storage means to said inverter at said second rate.

8. The apparatus of claim 7, wherein said A. C. machine is a multiple phase induction motor, said inverter is subdivided into portions, each energizing one of said phases, and said logic means is operative to transmit said stored signals to each of said portions at a phase relationship established by the number of said phases.

9. The apparatus of claim 6, wherein said first and second storage means comprise shift registers.

10. The apparatus of claim 1, wherein the generation of switch command signals is initiated by an interrupt signal within said control circuit.

11. The apparatus of claim 10, further comprising means operative to engage said control circuit in ancillary logic activities prior to said interrupt signal.

12. The apparatus of claim 10, wherein said interrupt signal is generated by said control circuit as a function of said synchronizing signal.

13. In combination:
   an A.C. induction machine having characteristic stator and rotor frequencies associated therewith;
   an inverter for providing a PWM power output to said machine at a preselectable frequency and a preselectable voltage from a substantially fixed D.C. bus;
   a control circuit operative to receive a plurality of parametric inputs and to generate optimized switch command signals at a first rate established by a clock independent of said stator and rotor frequencies; and
   shift register means operative to receive and store said switch command signals and to transfer said signals to the inverter at a second rate established by a synchronizing signal which is a function of the summation of signals representative of machine rotor speed and a derived slip command.

14. In combination:
   a three-phase induction motor having characteristic stator and rotor frequencies associated therewith;
   a substantially fixed D.C. power source;
   an inverter for providing a power input from said power source and a PWM power output to said motor at a preselectable frequency and a preselectable voltage;
   a control circuit operative to receive a plurality of parametric inputs from said power source, inverter and motor and to generate optimized switch command signals at a rate established by a clock independent of said stator and rotor frequencies; and
   shift register means operative to asynchronously transfer said switch command signals to said inverter at a variable rate established by a synchronizing signal which is a function of the summation of signals representative of motor rotor speed and a derived slip command.

15. The apparatus of claim 14, wherein said derived slip command is generated by said control circuit as a function of said parametric inputs.

16. The apparatus of claim 14, wherein one of said parametric inputs comprises an operator torque demand signal.

17. A drivetrain adapted for use with an electric vehicle having at least one tractive wheel, said drivetrain comprising:

a substantially fixed D.C. power source;

a three-phase induction motor having characteristic stator and rotor frequencies associated therewith;

an inverter for providing a power input from said power source and a PWM power output to each phase of said motor at a preselectable frequency and a preselectable voltage;

a control circuit operative to receive an operator torque demand signal and a plurality of parametric input signals from said power source, inverter and motor and to generate optimized switch command signals as a function of said inputs at a fixed rate established by a clock independent of said stator and rotor frequencies; and shift register means operative to receive and store said switch command signals and to periodically transfer said signals to the inverter at a second rate established by a synchronizing signal which is a function of the summation of signals representative of machine rotor speed and a derived slip command.

18. The drivetrain of claim 17, further comprising transmission means adapted to mechanically couple the rotor of said motor to the tractive wheel.

19. The drivetrain of claim 18, wherein said transmission means comprises an input shaft, an output shaft and selectable multiple gear ratios engagingly disposed therebetween.

20. The drivetrain of claim 19, further comprising transmission gear ratio control means operative to receive transmission gear shift control signals from said control circuit and select one of said gear ratios in response thereto.

21. A method of controlling an inverter for providing a PWM power output to an A.C. induction machine at a preselectable frequency and a preselectable voltage from a substantially fixed D.C. bus, said A.C. machine having characteristic stator and rotor frequencies associated therewith, said method comprising the steps of:

monitoring parametric information inputs including operator torque demands;

generating optimized duty cycle and wave shape data as a function of said inputs;

serially transferring said data to shift register means at a first rate established by a clock independent of said stator and rotor frequencies;

deriving a slip command signal as a function of said inputs;

generating a rotor frequency signal as a function of machine rotor speed;

summing the slip command and rotor frequency signals; and transferring said data from the shift register means to the inverter at a rate established by said summed signals.

22. The method of claim 21, further comprising the step of storing said data within said shift register means prior to transmission of said data to the inverter.

23. The method of claim 22, further comprising the step of periodically interrupting the generation of subsequent data during the time in which said data is stored.

* * * * *